United States Patent [19]

Manthis

[11] Patent Number: 4,614,694
[45] Date of Patent: Sep. 30, 1986

[54] ELECTROLYTE BATTERY ANTI-SPLASH SYSTEM

[75] Inventor: Danny O. Manthis, Highland, Calif.

[73] Assignee: Teledyne Industries, Inc., Los Angeles, Calif.

[21] Appl. No.: 764,105

[22] Filed: Aug. 9, 1985

[51] Int. Cl.⁴ .............................................. H01M 2/12
[52] U.S. Cl. ......................................... 429/84; 429/8; 429/121
[58] Field of Search ................... 429/84, 8, 72, 82, 87, 429/88, 121, 122

[56] References Cited

U.S. PATENT DOCUMENTS

| | | | |
|---|---|---|---|
| 3,011,503 | 12/1961 | Widham | 429/84 |
| 4,348,466 | 9/1982 | Elehew et al. | 429/84 |
| 4,486,516 | 12/1984 | Poe | 429/88 X |

Primary Examiner—Charles F. LeFevour
Attorney, Agent, or Firm—Benoit Law Corporation

[57] ABSTRACT

The subject invention provides a baffle capable of floating on the electrolyte in a battery cell, and diverts with that floating baffle any splashing electrolyte away from a gas venting device at the top of the cell, particularly during vibration of that cell.

20 Claims, 3 Drawing Figures

ELECTROLYTE BATTERY ANTI-SPLASH SYSTEM

BACKGROUND OF THE INVENTION

1. Field of the Invention

The subject invention relates to electrolyte-containing batteries and cells and, more specifically, to devices and systems for preventing a splashing of electrolyte out of gas venting devices and other openings during vibration of battery or cell.

2. Information Disclosure Statement

Splashing of electrolytes out of electrical batteries has been a problem practically from the time when the first battery with free-flowing electrolyte was put into operation in a vehicular or other environment subjecting the battery to vibration.

In this respect, dry batteries have their utility, but cannot displace wet batteries in fields of heavy current demand and certain other areas.

Sealed batteries with starved electrolyte are, of course, spill-proof, when properly used and operated, but are not likely to displace the wet electrolyte battery in many fields of utility. Also, such sealed or electrolyte-starved batteries are not acceptable in applications where hygrometer measurement of battery condition is prescribed by regulation or otherwise highly desirable.

Anti-spill battery vent plugs are doing a good job in many situations, but are not always acceptable, be it in case of heavy vibrational exposure or for other reasons.

Accordingly, there persisted a need for an anti-splash system in batteries employing a free electrolyte and typically conventional vent plugs.

SUMMARY OF THE INVENTION

It is a general object of this invention to overcome the above mentioned disadvantages and to meet the needs expressed or implicit in the above Information Disclosure Statement or in other parts hereof.

It is a germane object of this invention to maintain batteries destined for in vibrational environments accessible to hygrometer testing and susceptible to use of simple gas-venting plugs.

It is a related object of this invention to provide electrolyte batteries and cells with anti-splash systems.

Other objects of this invention will become apparent in the further course of this disclosure.

The subject invention resides in a battery, or in a method for providing a battery, having a casing including a cell chamber for receiving electrolyte, battery elements including positive and negative battery plates disposed for immersion in the electrolyte in the cell chamber, a cover for said casing spaced from the battery elements in the cell chamber, and a gas venting device for that cell chamber extending through the cover and, more specifically, resides in the improvement of preventing electrolyte from splashing through the gas venting device during vibration of the battery.

From a first aspect thereof, the above mentioned method, according to the subject invention, comprises in combination the steps of providing separately from the gas venting device a baffle plate capable of floating on the electroylyte in the cell chamber, disposing the baffle plate between the battery plates and the gas venting device for flotation on the electrolyte below the gas venting device, and diverting with that floating baffle plate any splashing electrolyte away from the gas venting device.

From a related aspect thereof, the above mentioned battery according to the subject invention comprises a baffle plate capable of floating on the electrolyte in the cell chamber separately from the gas venting device for diverting splashing electrolyte away from the gas venting device, said baffle plate being between the battery plates and the gas venting device for flotation on the electrolyte below the gas venting device.

Other aspects of the invention will become apparent in the further course of this disclosure, and no restriction to any object, aspect or feature is intended by this Summary of the Invention.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENT

Figure 1:
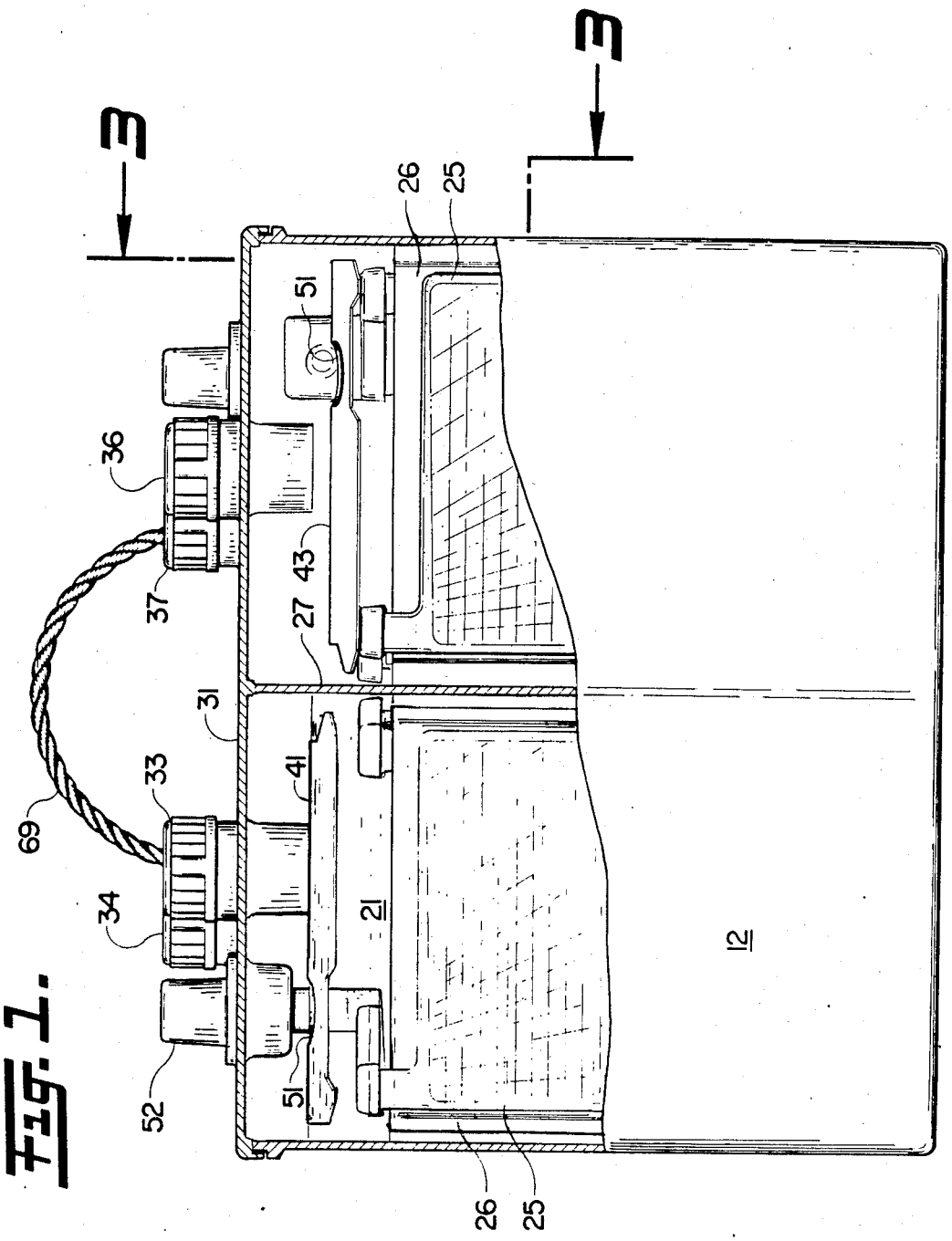
FIG. 1 is an elevation of a battery according to a preferred embodiment of the subject invention, with parts of a housing broken away along the line 2—2 of FIG. 1.
Figure 3:
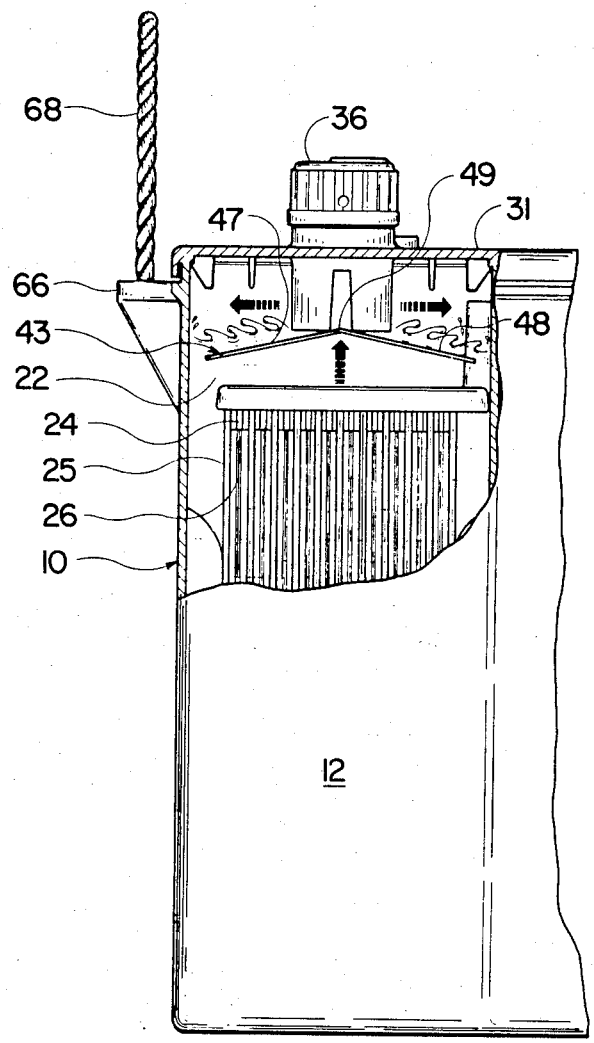
FIG. 3 is a side view of the battery of FIGS. 1 and 2, with part of the cover broken away along the line 3—3 in FIG. 1 to show a phase in the operation of the battery according to the illustrated preferred embodiment of the invention.

The battery 10 shown in the drawing has a casing 12 including battery cells 13, 14, 15, 16, 17 and 18 for receiving electrolyte, as shown at 21 in FIG. 1 and 22 in FIG. 3.

The battery 10 also has battery elements including positive and negative battery plates 24 and 25 disposed for immersion in the electrolyte in the particular cell chamber. Conventional separators 26 may be located between the positive and negative plates. The cell chambers are defined by the casing and by integral partition walls 27, 28, 29, etc.

The battery 10 also has a cover 31 for the casing spaced from the battery elements 24 and 25 in each cell chamber.

Each cell chamber has associated therewith a gas venting device for that cell chamber extending through the cover. In particular, the battery 10 has individual gas venting devices 33, 34, 35, 36, 37 and 38 for the cell chambers 13, 14, 15, 16, 17, and 18 respectively.

These venting devices preferably are of a simple conventional type, as required by many military and other battery users. Accordingly, electrolyte would splash through the gas vents 33 to 38 when the battery is subjected to vibration in vehicular and other applications.

The subject invention prevents electrolyte from splashing through any gas venting device during vibration of the battery 10 and, for this purpose, provides each cell chamber with a baffle plate presently to be described.

In particular, these baffle plate are fully or partially visible at 41, 42, 43 and 44 for the cell chambers 13, 14, 16 and 17. As seen particularly in the right-hand side of FIG. 1 and from the top view of the broken-away portion of FIG. 2, the baffle plates are provided separately from the gas venting devices. The baffle plates 41, 42, 43 et seq. are disposed between the battery plates 24, 25 and the gas venting devices 33 et seq. for flotation on the electrolyte 21 or 22 below each gas venting device.

As shown in FIGS. 1 and 3, the baffles 41, 42, 43, 44, etc. according to the subject invention are capable of floating on the electrolyte 21, 22, etc. in the cell chambers. The baffles 41, 42, 43, 44, etc. thus not only have to be resistant to the electrolyte 21, 22, etc., but also have to be light enough so as to float on the electrolyte.

As shown in FIG. 3, the subject invention diverts with each floating baffle 43, etc. any splashing electrolyte 22, etc. away from the gas venting device 36, etc.

According to the illustrated preferred embodiment, any baffle is provided with slanted sides 47 and 48 for diverting splashing electrolyte 22 laterally away from a top ridge 49 and thus from the adjacent vent plug 36. Particularly if the baffle sides 47 and 48 are slanted downwardly toward the positive and negative plates 24 and 25 in the cell chamber, then the electrolyte will flow away in ripples from the area of the vent plug, when battery and electrolyte are subjected to heavy vibration.

As shown in FIG. 3, each baffle has a V-shaped profile as seen in a longitudinal dimension of the baffle 43, etc.

Even though some diversion of electrolyte could be expected from the use of a baffle, the effect illustrated in FIG. 3 of the baffles according to the subject invention was very surprising and fully met a heretofore unresolved need.

According to the illustrated preferred embodiment, the baffle 41 is provided with an aperture 51 for accommodating with play a battery terminal 52 extending in the cell chamber 13 to and through the battery cover 31.

Figure 2:
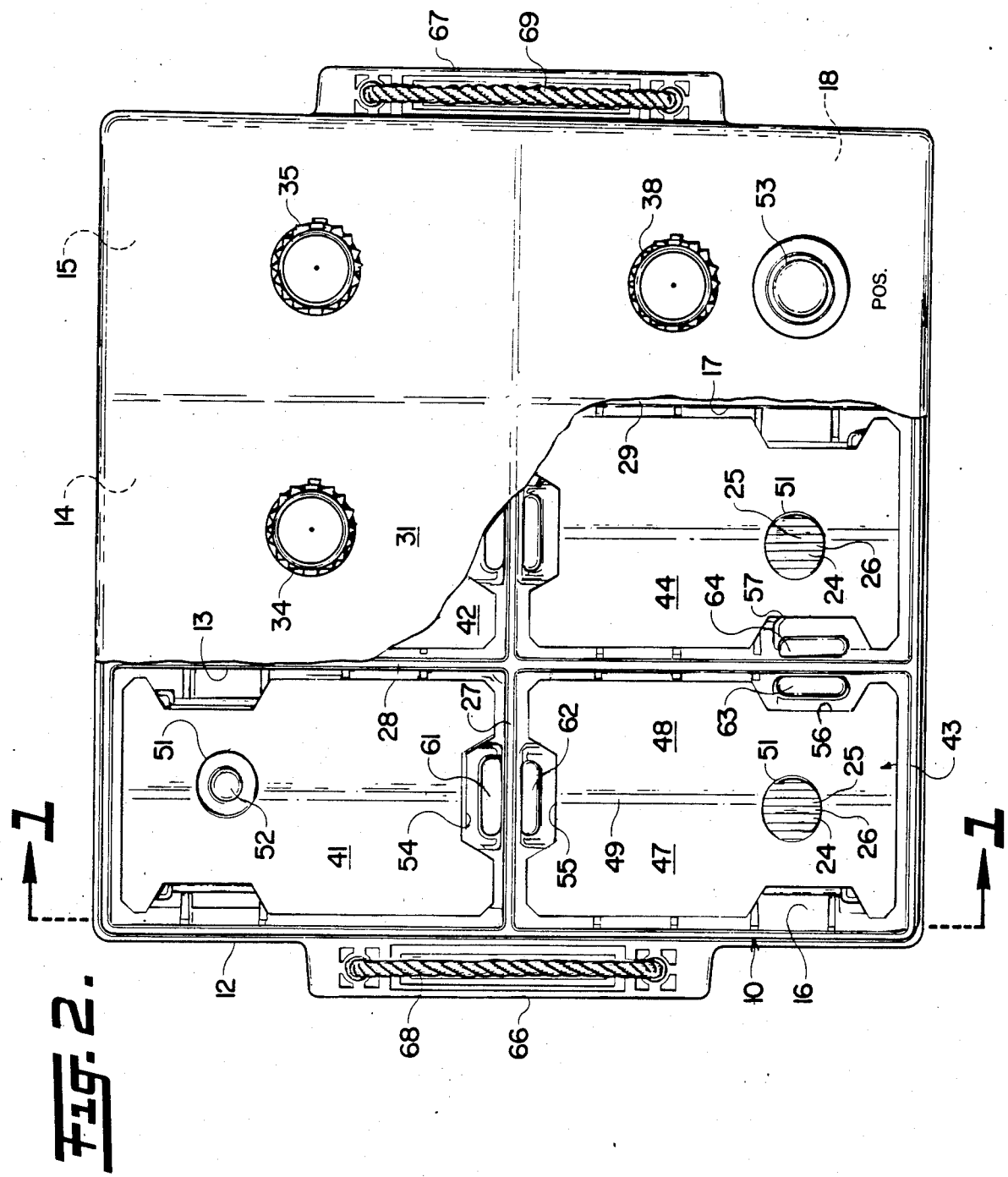
FIG. 2 is a top view of the battery of FIG. 1, with part of the cover broken away.

At least the baffle which accommodates with play the other terminal post 53 is provided with a like aperture. For manufacturing expediency, each of the other baffles may also be provided with an aperture 51. Practical tests have confirmed that this does not impair the anti-splash function of the baffle, as long as the aperture 51 is laterally displaced from any vent plug, as shown in FIGS. 1 and 2.

The baffles 41, 42, 43, 44, etc., are also provided with lateral indentations 54, 55, 56, 57, etc. for accommodating with play electrical connector lugs 61, 62, 63, 64, etc. extending in the cell chambers between the positive and negative plates 24 and 25 and the battery cover 31. For manufacturing expediency, all baffles may be provided with the same indentations.

The expression battery is used generically herein, and the invention may also be practised with a single electrochemical cell. However, as illustrated, the battery 10 is provided with several of the cell chambers 13, 14, 15, 16, 17 and 18, each having therein a pack of positive and negative battery plates 24 and 25 disposed for immersion in the electrolyte 21 or 22 in the particular cell chamber. As mentioned above, each cell chamber is then provided with a gas venting device 33, 34, 35, 36, 37 or 38 extending through the cover 31. According to the invention, there is provided in each cell chamber a baffle 41, 42, 43, 44, etc. capable of floating on the electrolyte 21 or 22 in that cell chamber for diverting any splashing electrolyte away from the gas venting device for that cell chamber.

The battery casing may have laterally projecting lugs or handles 66 and 67 facilitating the carrying, installation, replacement or removal of the battery. These handles 66 and 67 may be provided with ropes 68 and 69, respectively, of polyester or another electrolyte-resistant material.

In principle, the anti-splash system or baffles according to the subject invention may be applied to any primary or secondary electrochemical cell or battery. Examples include lead-acid and nickel-cadmium batteries and other acidic or alkaline cells.

One of the advantages of the subject invention is that it permits the use of conventional hygrometers and visual inspection for determining electrolyte and battery condition. Thus, in the illustrated preferred embodiment any of the threaded vent plugs 33 to 38 may simply be removed and the electrolyte level visually inspected, particularly by observation of the baffle 41, 42, 43, 44, etc. floating in the particular battery cell chamber.

Similarly, the aspiration tube of a hygrometer can simply be inserted through the threaded hole left in the battery cover 31 upon removal of the particular vent plug, and the baffle 41, 42, 43, 44, etc. floating in the particular cell chamber can simply be pushed downwardly with the hygrometer tube, so that a sufficient amount of electrolyte can be withdrawn for the measurement of its gravity in the hygrometer.

The subject invention thus permits retention of advantages which were lost in the development of sealed or starved-electrolyte batteries, without losing the anti-spill feature achieved by the latter types of batteries.

In a recent government procurement situation, a lead-acid battery with a baffle system according to the illustrated preferred embodiment of the subject invention was the only one of several competing models that successfully passed the vibration test for armored field vehicles required for the particular government agency.

By way of example and not by way of limitation, suitable materials for the baffles 41, 42, 43, 44, etc., are polyethylene, polypropylene or a polypropylene copolymer which is resistant to the electrolyte and is also light enough so as to float on the electrolyte in the battery.

The subject detailed disclosure will render apparent or suggest to those skilled in the art various modifications and variations within the spirit and scope of the subject invention.

I claim:

1. In a method of providing a battery having a casing including a cell chamber for receiving electrolyte battery elements including positive and negative battery plates disposed for immersion in the electrolyte in the cell chamber, a cover for said casing spaced from the battery elements in the cell chamber, and a gas venting device for that cell chamber extending through said cover, the improvement of preventing electrolyte from splashing through the gas venting device during vibration of the battery, comprising in combination the steps of:

providing separately from said gas venting device a baffle plate capable of floating on the electrolyte in the cell chamber;

disposing said baffle plate between said battery plates and said gas venting device for flotation on the electrolyte below said gas venting device, and disverting with the floating baffle plate any splashing electrolyte away from the gas venting device.

2. A method as claimed in claim 1, including the step of:
providing said baffle plate with an aperture for accommodating with play a battery terminal post extending in the cell chamber to said cover.

3. A method as claimed in claim 1, including the step of:
providing said baffle plate with lateral indentations for accommodating with play electrical connector lugs extending in the cell chamber between said battery plates and said cover.

4. A method as claimed in claim 3, including the step of:
providing said baffle plate with an aperture for accommodating with play a battery terminal post extending in the cell chamber to said cover.

5. A method as claimed in claim 1, including the step of:
providing said baffle plate with slanted sides for diverting splashing electrolyte.

6. A method as claimed in claim 5, including the step of:
slanting said sides toward the positive and negative battery plates in the cell chamber.

7. A method as claimed in claim 1, including the step of:
giving said baffle plate a V-shaped profile as seen in a longitudinal dimension of said baffle plate.

8. A method as claimed in claim 1. including the steps of:
providing said battery with several of said cell chambers, each having therein a pack of positive and negative battery plates disposed for immersion in the electrolyte in the particular cell chamber;
providing each cell chamber with a gas venting device extending through said cover; and
providing in each cell chamber a said baffle plate capable of floating on the electrolyte in that cell chamber for diverting any splashing electrolyte away from the gas venting device for that cell chamber.

9. In a battery having a casing including a cell chamber for receiving electrolyte, battery elements including positive and negative battery plates disposed for immersion in the electrolyte in the cell chamber, a cover for said casing spaced from the battery elements in the cell chamber, and a gas venting device for that cell chamber extending through said cover, the improvement of preventing electrolyte from splashing through the gas venting device during vibration of the battery, comprising:
a baffle plate capable of floating on the electrolyte in the cell chamber separately from said gas venting device for diverting splashing electrolyte away from the gas venting device, said baffle plate being between said battery plates and said gas venting device for flotation on the electrolyte below said gas venting device.

10. A battery as claimed in claim 9, wherein:
said baffle plate has an aperture for accommodating with play a battery terminal post extending in the cell chamber to said cover.

11. A battery as claimed in claim 9, wherein:
said baffle plate has lateral indentations for accommodating with play electrical connector lugs extending in the cell chamber between said battery plates and said cover.

12. A battery as claimed in claim 9, wherein:
said baffle plate has an aperture for accommodating with play a battery terminal post extending in the cell chamber to said cover.

13. A battery as claimed in claim 9, wherein:
said baffle plate has slanted sides for diverting splashing electrolyte.

14. A battery as claimed in claim 13, wherein:
said sides, are slanted toward the positive and negative battery plates in the cell chamber.

15. A battery as claimed in claim 9, wherein:
said baffle plate has a V-shaped profile as seen in a longitudinal dimension of said baffle plate.

16. In a battery having a casing including several cell chambers, each having therein battery elements including positive and negative battery plates disposed for immersion in an electrolyte in that cell chamber, a cover for said casing spaced from the battery elements in each cell chamber, and a gas venting device for each cell chamber extending through said cover, the improvement of preventing electrolyte from splashing through the gas venting devices during vibration of the battery, comprising in combination:
a baffle plate in each cell chamber capable of floating on the electrolyte in that cell chamber separately from said gas venting device for diverting any splashing electrolyte away from the gas venting device at said cell chamber, each baffle plate being between the battery plates and the gas venting device of the particular cell chamber for flotation on the electrolyte below the latter gas venting device.

17. A battery as claimed in claim 16, wherein:
the baffle plates in at least two of the cell chambers have an aperture for accommodating with play a battery terminal post extending to said cover.

18. A battery as claimed in claim 16, wherein:
the baffle plates in said cell chambers have lateral indentations for accommodating with play lugs of electrical connectors extending between positive and negative battery plates of adjacent cell chambers.

19. A battery as claimed in claim 16, wherein:
each baffle plate has slanted sides for diverting splashing electrolyte.

20. A battery as claimed in claim 19, wherein:
said sides are slanted toward the positive and negative battery plates in each cell chamber.

* * * * *